US012614266B2

(12) United States Patent
Liu et al.

(10) Patent No.: US 12,614,266 B2
(45) Date of Patent: Apr. 28, 2026

(54) QUALITY MEASUREMENT BETWEEN MISMATCHED VIDEOS

(71) Applicant: Beijing YoJaJa Software Technology Development Co., Ltd., Beijing (CN)

(72) Inventors: Chen Liu, Beijing (CN); Xiaobo Liu, Beijing (CN); Wenhao Zhang, Beijing (CN); Xuchang Huangfu, Beijing (CN)

(73) Assignee: Beijing YoJaJa Software Technology Development Co., Ltd., Beijing (CN)

( * ) Notice: Subject to any disclaimer, the term of this patent is extended or adjusted under 35 U.S.C. 154(b) by 447 days.

(21) Appl. No.: 18/177,091

(22) Filed: Mar. 1, 2023

(65) Prior Publication Data

US 2024/0212118 A1     Jun. 27, 2024

(30) Foreign Application Priority Data

Dec. 26, 2022    (CN) .......................... 202211673966.2

(51) Int. Cl.
G06T 7/00          (2017.01)
G06V 10/74          (2022.01)
(52) U.S. Cl.
CPC .......... G06T 7/0002 (2013.01); G06V 10/761 (2022.01); G06T 2207/30168 (2013.01)
(58) Field of Classification Search
CPC .................. G06V 10/761; G06V 20/48; G06T 2207/30168; G06T 7/0002; H04N 19/154; H04N 21/23439; H04N 21/234363; G11B 27/031
See application file for complete search history.

(56) References Cited

U.S. PATENT DOCUMENTS

| | | | |
|---|---|---|---|
| 6,101,276 A | 8/2000 | Adiletta et al. | |
| 8,094,196 B2 | 1/2012 | Okamoto et al. | |
| 2009/0147143 A1* | 6/2009 | Sherif .................... | H04N 19/85 |
| | | | 348/701 |
| 2011/0255738 A1* | 10/2011 | Gao ...................... | G06V 30/242 |
| | | | 382/103 |
| 2013/0194434 A1* | 8/2013 | Krishnakumar ..... | G06V 40/161 |
| | | | 348/192 |
| 2013/0202184 A1* | 8/2013 | Grove ....................... | G06T 5/73 |
| | | | 382/136 |

(Continued)

FOREIGN PATENT DOCUMENTS

WO        WO-2017084256 A1 *    5/2017    ............. H04N 17/00

OTHER PUBLICATIONS

Clipchamp. "What Is a Freeze Frame in Film?: Clipchamp Blog." Clipchamp, Apr. 29, 2021, clipchamp.com/en/blog/what-freeze-frame-film/. (Year: 2021).*

*Primary Examiner* — Gregory A Morse
*Assistant Examiner* — Stefano Anthony Dardano
(74) *Attorney, Agent, or Firm* — Kwan & Olynick LLP

(57)        ABSTRACT

In some embodiments, a method receives a first video and processes frames of the first video to generate a second video. A frame matching process is performed to determine whether frames of the second video and frames of the first video meet a condition that determines whether frames match to generate a new version of the second video and a new version of the first video. A sequence of frames in the new version of the first video is different from the first video. The method compares frames of the new version of the second video and frames of the new version of the first video to generate a score based on a quality metric.

20 Claims, 10 Drawing Sheets

(56)  References Cited

U.S. PATENT DOCUMENTS

| | | | |
|---|---|---|---|
| 2014/0240522 A1* | 8/2014 | Lee | H04N 17/004 |
| | | | 348/192 |
| 2017/0359601 A1* | 12/2017 | Sievers | H04N 9/8205 |
| 2019/0246112 A1* | 8/2019 | Li | H04N 19/154 |
| 2020/0059652 A1* | 2/2020 | Brice | H04N 19/176 |
| 2021/0319062 A1* | 10/2021 | Long | G06V 20/48 |
| 2021/0352341 A1* | 11/2021 | Pahalawatta | H04N 21/2343 |
| 2022/0303457 A1* | 9/2022 | Bastide | H04N 5/2222 |

* cited by examiner

QUALITY MEASUREMENT BETWEEN MISMATCHED VIDEOS

CROSS REFERENCE TO RELATED APPLICATIONS

Pursuant to 35 U.S.C. § 119(a), this application is entitled to and claims the benefit of the filing date of CN 202211673966.2 filed Dec. 26, 2022 in China, entitled "QUALITY MEASUREMENT BETWEEN MIS-MATCHED VIDEOS", the content of which is incorporated herein by reference in its entirety for all purposes.

BACKGROUND

A system may receive a source video that can be used to deliver different versions of the source video to clients. To generate the different versions, the system may input the source video into a degradation process, which results in a degraded version of the video content found in the source video. For example, the source video may be transcoded into different profiles or variants, such as different bitrates and/or quality levels, but other degradation processes may be performed.

The system may perform a video quality process to evaluate the quality of the degraded video compared to the source video. For example, the video quality process may sequentially compare frames of the source video and the degraded video frame by frame to determine a difference between the two frames. A video quality metric may be used to compare corresponding frames, and a video quality score may be output based on the comparison. In some cases, the video quality process may not provide accurate video quality scores when certain events occur in the degradation process. For example, events such as frame dropping and duplicate frames in the degraded video, may cause the frame-by-frame comparison to yield quality scores that are meaningless and not accurate. For example, a dropped frame #3 in the degraded video may cause the video quality process to compare frame #3 of the source video with frame #4 of the degraded video, which results in an accurate score because the frames are not matched correctly for the comparison. Accordingly, the scores may not be accurate and cannot be used to evaluate the degraded video. The resources that were used to perform the video quality process may be wasted.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
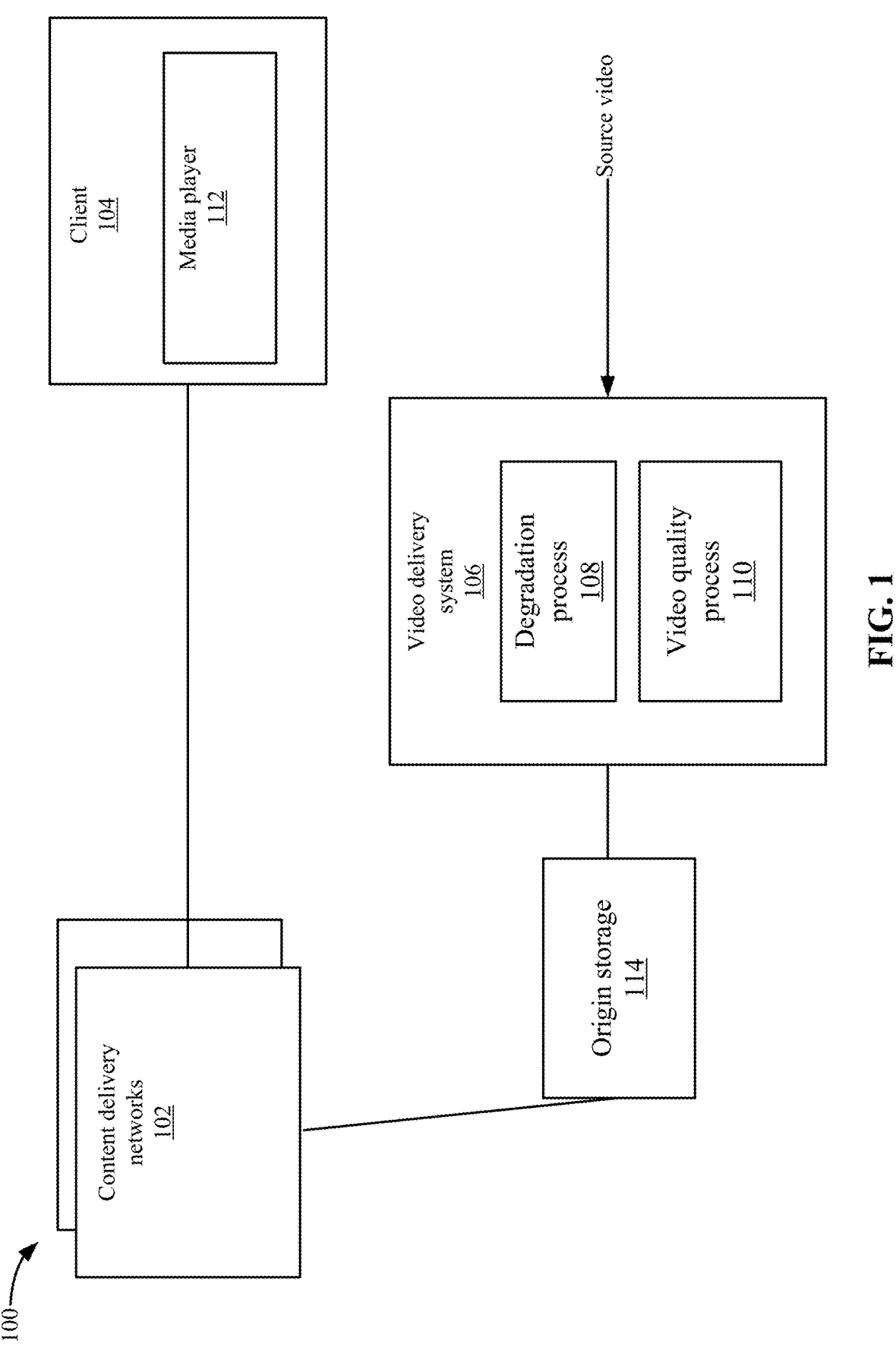
FIG. 1 depicts a simplified system for performing a video quality process on a source video according to some embodiments.

Described herein are techniques for a video processing system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

In some embodiments, a system may receive a source video and input the source video into a degradation process. The degradation process may output a degraded version of the video content found in the source video. The degradation process may change a characteristic of the source video, and may include video compression, video processing (e.g., denoising), video resizing, video frame rate conversion, etc. The system then performs a video quality process on the source video and the degraded video. The video quality process may compare frames of the source video and the degraded video to determine a score. The score may quantify the quality (e.g., fidelity) of the degraded video compared to the source video. The quality may be determined based on a video quality measurement, such as peak signal-to-noise ratio (PSNR), structural similarity index measure (SSIM), video multimethod assessment fusion (VMAF), or other metrics. The comparison may be performed on a frame-by-frame basis using sequential frames from the source video and the degraded video. As discussed in the Background, the degraded video may introduce frame sequence variations that may affect the video quality process. For example, the degradation process may drop some frames, duplicate some frames, or produce frames that are out of order.

If the video quality process is performed sequentially on frames of the source video and the degraded video, some frames that are compared may not match. For example, if a frame #3 is dropped in the degraded video, then the video quality process may compare frame #3 of the source video with frame #4 of the degraded video. Also, if the frame #3 is duplicated in the degraded video, the video quality process may compare frame #4 of the source video with frame #3 of the degraded video. In the process, the frame of the source video should be compared with the frame from the degraded video that was output by the degradation process using the same frame of the source video. In the case of the dropped frame, frame #4 of the degraded video was generated using frame #4 of the source video, and comparing frame #3 of the source video with frame #4 of the degraded video does not compare corresponding frames. Similarly, in the case of the duplicated frame, frame #3 of the degraded video was generated using frame #3 of the source video, and comparing frame #4 of the source video with frame #3 of the degraded video does not compare corresponding frames. The resulting score of the video quality process may not accurately represent the quality between the frames of the degraded video and the source video when the frame sequence variations occur. For example, the video quality score may indicate very low quality (e.g., be very low) because the content of the two frames may be different due to the dropped frame or the duplicated frame. Further, the scores for frames after the duplicated frame or the dropped frame may also be incorrect because the video quality process continues to analyze frames sequentially. For example, the video quality process may next analyze frame #4 of the source video and frame #5 of the degraded video. This may lead to a very low video quality score, which may not be useful or accurate.

To overcome the above problem, the video quality process may use a unique combination of elements that includes a frame matching process. The frame matching process may analyze the source video and the degraded video to determine when variations in the frames occur that may affect the video quality process. For example, the frame matching process may detect dropped frames, duplicate frames, out of order frames, etc. Then, the frame matching process may store frames that meet frame level matching conditions in a new version of the source video and a new version of the degraded video. After generating the new versions, the video quality process may evaluate the quality of the new version of the degraded video compared to the source video. The result may be a more accurate score of the quality of the degraded version versus the source video.

The above process provides many technical advantages. For example, the video quality score may be more accurate using the frame matching process because the frames that are compared may consider variations that occurred in the degradation process. For example, if a frame #3 is dropped, then the video quality process may not compare a frame #3 from the source video. Also, if a frame #5 is duplicated, then the video quality process may add two frames #5 in the new version of the source video to match the duplicated frames #5 in the degraded video. The above process may save computing resources because the video quality process may not produce inaccurate results, which may require rerunning the video quality process.

System Overview

FIG. 1 depicts a simplified system 100 for performing a video quality process on a source video according to some embodiments. System 100 includes content delivery networks 102, client 104, a video delivery system 106, and a degradation process 108. A source video may include different types of content, such as video, audio, or other types of content information. Video may be used for discussion purposes, but other types of content may be appreciated. In some embodiments, the source video may be an asset file may be received in a format that requires transcoding to another format. For example, the video asset file may be a mezzanine file that includes compressed video. The mezzanine file may be transcoded (e.g., encoded) to create other files, such as different profiles of the video. Other degradation processes may also be appreciated as discussed above.

A content provider may operate video delivery system 106 to provide a content delivery service that allows entities to request and receive media content. The content provider may use video delivery system 106 to coordinate the distribution of media content to client 104. Although a single client 104 is discussed, multiple clients may be requesting and receiving media content. The media content may be different types of content, such as on-demand videos from a library of videos and live videos. In some embodiments, live videos may be where a video is available based on the linear schedule. Videos may also be offered on-demand. On-demand videos may be content that can be requested at any time and not limited to viewing on a linear schedule. The videos may be programs, such as movies, shows, advertisements, etc. As discussed above, the video for a video asset file may be offered as a live video and also on demand; however, other scenarios may exist, such as there may be timing requirement for a movie that is released.

Client 104 may include different computing devices, such as smartphones, living room devices, televisions, set top boxes, tablet devices, etc. Client 104 includes a media player 112 that can play content, such as a video. In some embodiments, media player 112 receives segments of video and can play these segments. Client 104 may send requests for segments to content delivery network 102, and then receive the requested segments for playback in media player 112. The segments may be a portion of the video, such as six seconds of the video.

Content delivery network 102 includes servers that can deliver a video to client 104. Content delivery network 102 receives requests for segments of video from client 104, and delivers segments of video to client 104. Client 104 may request a segment of video from one of the profile levels based on current playback conditions. The playback conditions may be any conditions that are experienced based on the playback of a video, such as available bandwidth, buffer length, etc. For example, client 104 may use an adaptive bitrate algorithm to select the profile for the video based on the current available bandwidth, buffer length, or other playback conditions. Client 104 may continuously evaluate the current playback conditions and switch among the profiles during playback of segments of the video. For example, during the playback, media player 112 may request different profiles of the video asset. For example, if low bandwidth playback conditions are being experienced, then media player 112 may request a lower profile that is associated with a lower bitrate for an upcoming segment of the video. However, if playback conditions of a higher available bandwidth are being experienced, media player 112 may request a higher-level profile that is associated with a higher bandwidth for an upcoming segment of the video.

Degradation process 108 may create a new version of the source video, which may be referred to as a degraded video. The degradation process may change a characteristic of the source video. As mentioned above, the degradation of the source video may include video compression, video processing, video resizing, etc. For example, for compression, the degradation process changes a bitrate of the source video. Although degradation is described, the degradation process may alter any characteristic of the source video.

In the example of video compression, degradation process 108 may transcode video asset files that are received and publish the transcoded videos on a service in which client 104 can request playback of the videos. In the video transcoding process, video delivery system 106 may receive video asset files that require transcoding from one format to another format. A source video may be used to produce other versions of source video through a degradation process. The source video may be transcoded in multiple profiles that correspond to different configurations, which may be different levels of bitrates and/or quality, but may also include other characteristics, such as codec type, computing resource type (e.g., computer processing unit), etc. Each video may have associated profiles that have different configurations. The profiles may be classified at different levels and each level may be associated with a different configuration. For example, a level may be combination of bitrate, resolution, codec, etc. For example, each level may be associated with a different bitrate, such as 400 kilobytes per second (kbps), 650 kbps, 1000 kbps, 1500 kbps, . . . 12000 kbps. Also, each level may be associated with another characteristic, such as a quality characteristic (e.g., resolution). The profile levels may be referred to as higher or lower, such as profiles that have higher bitrates or quality may be rated higher than profiles with lower bitrates or quality.

Once the transcoding of at least one profile is complete, video delivery system 106 may publish the video asset on the service. In some embodiments, video delivery system 106 may publish the profiles that are transcoded on origin storage 114. Then, content delivery networks 102 may receive a request and receive the profiles from origin storage 114 when they are requested by client 104. Other configurations may also exist, such as the profiles may be individually sent to each content delivery network 102.

After publishing the profiles, the video asset may be requested and delivered to a client 104 for playback. For example, after broadcast, video delivery system 106 may publish the video asset as a video-on-demand asset, which may be requested at any time by a client 104. In some examples, a user account may request playback of an episode of a show at a later time.

Video quality process 110 may perform a video quality analysis using the source video and a degraded video. The following will discuss the process with one version of the degraded video, but the process may be performed for multiple versions of degraded videos for the source video. Video quality process 110 may measure the quality of the degraded video compared to the source video based on comparing a characteristic or characteristics of each video. In some embodiments, video quality process 110 may quantify the measurement into a score. Different scores may be used. For example, video quality process 110 may generate frame level scores for individual frames. A frame of a video may be an image in the sequence of images found in the video. Then, video quality process 110 may generate a video level score for the degraded video, which may be determined based on frame level scores. The video may comprise all of the frames. The generation of the scores will be described in more detail below.

Video delivery system 106 may use the score to perform different processes. For example, video delivery system 106 may use the score to determine whether or not the degraded video should be released on the video delivery service for delivery to client 104, or whether the degradation process should be performed again. In some examples, video delivery system 106 may wish to transcode the source video into multiple bitrates and/or quality levels. For example, the source video is input into degradation process 108, and degradation process 108 outputs degraded videos with different bitrates and/or quality levels. Video quality process 110 then analyzes the degraded videos and outputs scores for the videos. Video quality process 110 may compare the score to a threshold. If the score meets the threshold (e.g., is above the threshold), video delivery system 106 may release the degraded video to origin storage 114, and client 104 may request the degraded video. If the score does not meet the threshold (e.g., is lower than the threshold), video delivery system 106 may perform the degradation process again.

If the score is not accurate, then this may result in video delivery system 106 releasing a degraded video that may be suboptimal. For example, if some frames of the degraded video have low quality compared to the source video, users may notice the low quality when playing the degraded video. Accordingly, the video delivery system 106 may not want to release this version of the degraded video and may want to perform the degradation process again. However, if the video quality process score is not accurate, video delivery system 106 may be making decisions on releasing the degraded video using inaccurate scores. Accordingly, it is important to have an accurate score for a degraded video.

The following will now describe the video quality process and the frame matching process in more detail.

Video Quality Process

Figure 2:
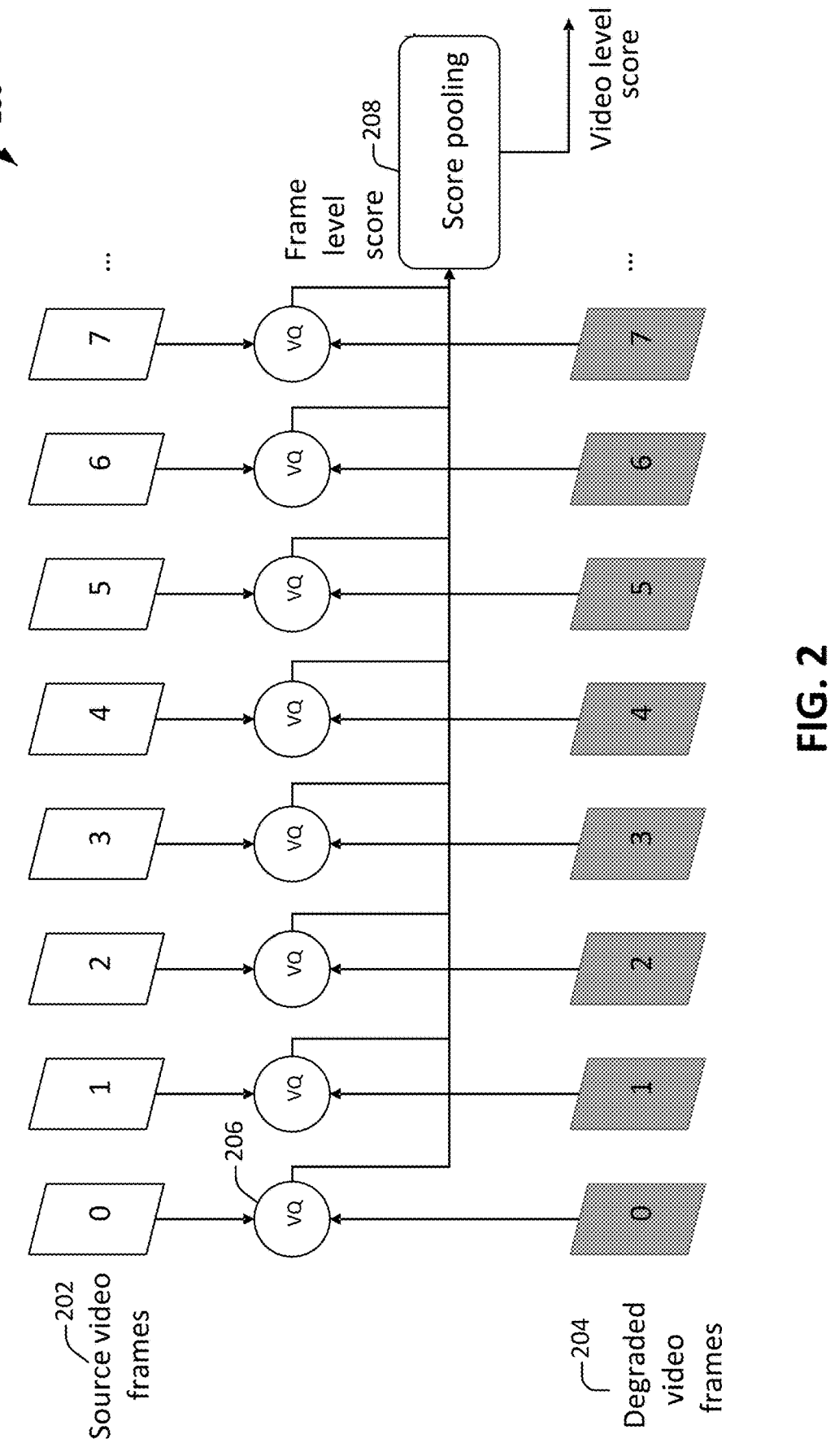
FIG. 2 depicts a general example of the video quality process according to some embodiments.

The following will describe different examples of variations that may result in the degraded video. FIG. 2 depicts a general example of the video quality process according to some embodiments. At 202, source video frames of the source video are shown. For example, source video frames #0 to #7 are shown, but other video frames may be found in the source video. At 204, the degraded video also includes degraded video frames #0 to #7, but other frames may be included.

Video quality process 110 may include a frame level video quality process and a video level video quality process. At 206, a frame level video quality process (VQ) may analyze corresponding frames, such as frame #0 of the source video frames is compared with frame #0 of the degraded video frames. The frame level video quality process outputs a frame level score for the comparison. Similarly, the frame level video quality process analyzes frame #1 of the source video frames and frame #1 of the degraded video frames, and outputs a frame level score for the comparison. The frame-by-frame comparison continues sequentially. At 208, the video level video quality process includes a score pooling process may aggregate the frame level scores into a video level score. The video level video quality process may use different functions to aggregate the frame level scores, such as averaging, a sliding window moving average, a median, etc.

Figure 3:
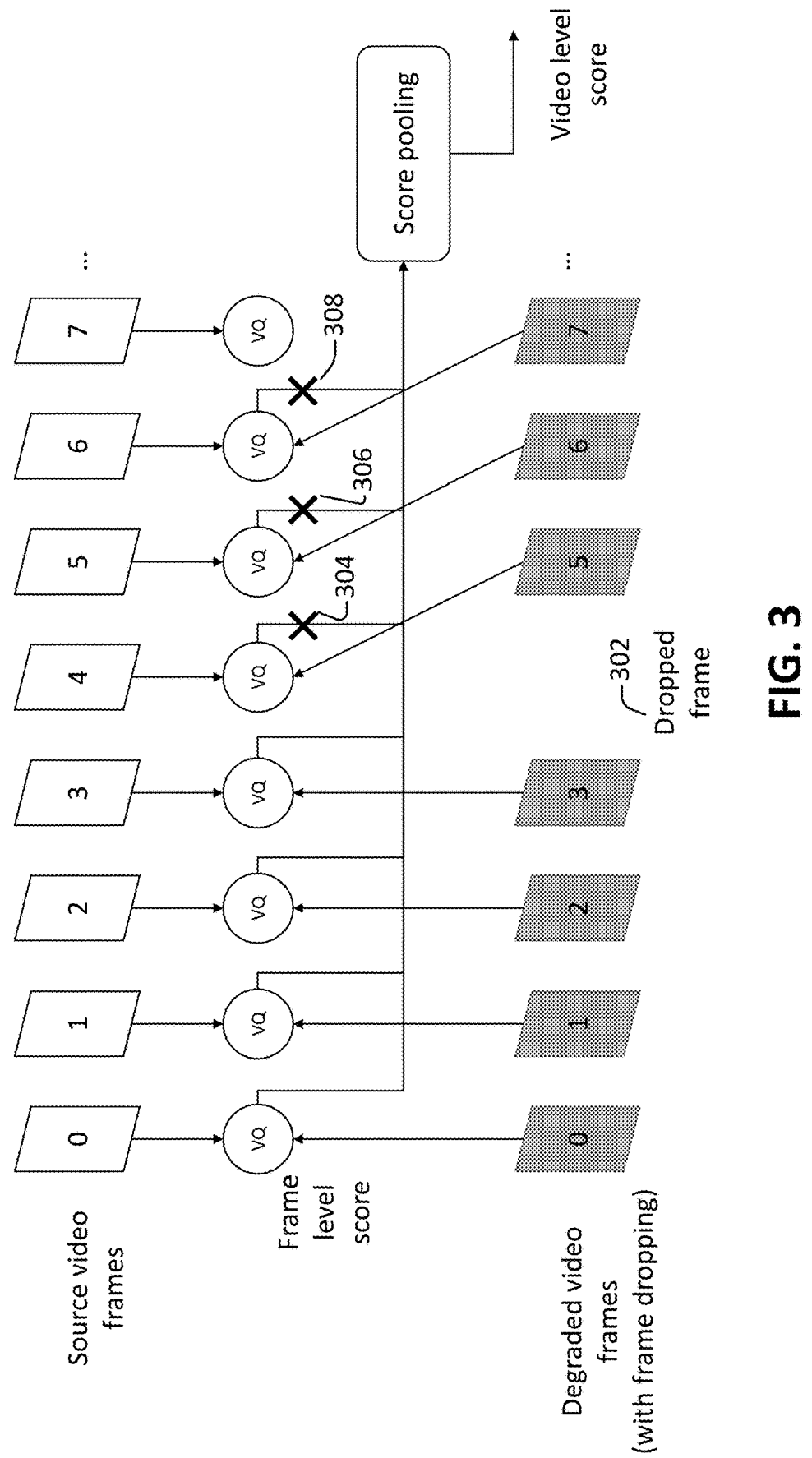
FIG. 3 depicts an example of when a dropped frame occurs in the degraded video according to some embodiments.

Different variations may result in the frame sequence in the degraded video. A variation may alter the sequence of frames in the degraded video compared to the sequence in the source video. FIG. 3 depicts an example of when a dropped frame occurs in the degraded video according to some embodiments. In FIG. 3, the frames may be dropped due to various reasons, such as frame rate change, time stamp alignment, sub video stitching, communication channel jitter, etc. Degradation process 108 may determine when to drop frames based on performing its degradation process. The degraded video frames are numbered based on the source video frame used to generate the degraded video frame. For example, frame #1 of the degraded video frames is generated using frame #1 of the source video frames, frame #2 of the degraded video frames is generated using frame #2 of the source video frames, etc. At 302, the degraded video frames include a dropped frame of frame #4. That is, frame #4 is not included in the degraded video frames in between frame #3 and frame #5. In this case, the video quality process may output an inaccurate score. For example, at 304, the video quality process may analyze frame #4 of the source video frames and frame #5 of the degraded video frames. In this case, frame #5 of the degraded video frames was generated using frame #5 of the source video. Because frame #4 and frame #5 are not corresponding frames from the source video, such as the video content may be different, the frame level score may not accurately represent the quality of the degraded video.

As discussed above, frame #4 of the source video frames should be compared to frame #4 of the degraded video frames for an accurate frame level score. Further, because of the dropped frame, subsequent comparisons may also be inaccurate. For example, at 306, frame #5 of the source video frames is compared with frame #6 of the degraded video frames, and at 308, frame #6 of the source video frames is compared with frame #7 of the degraded video frames. The video level video quality process may use these inaccurate frame level scores, which may cause an inaccurate video level score for the degraded video.

Figure 4:
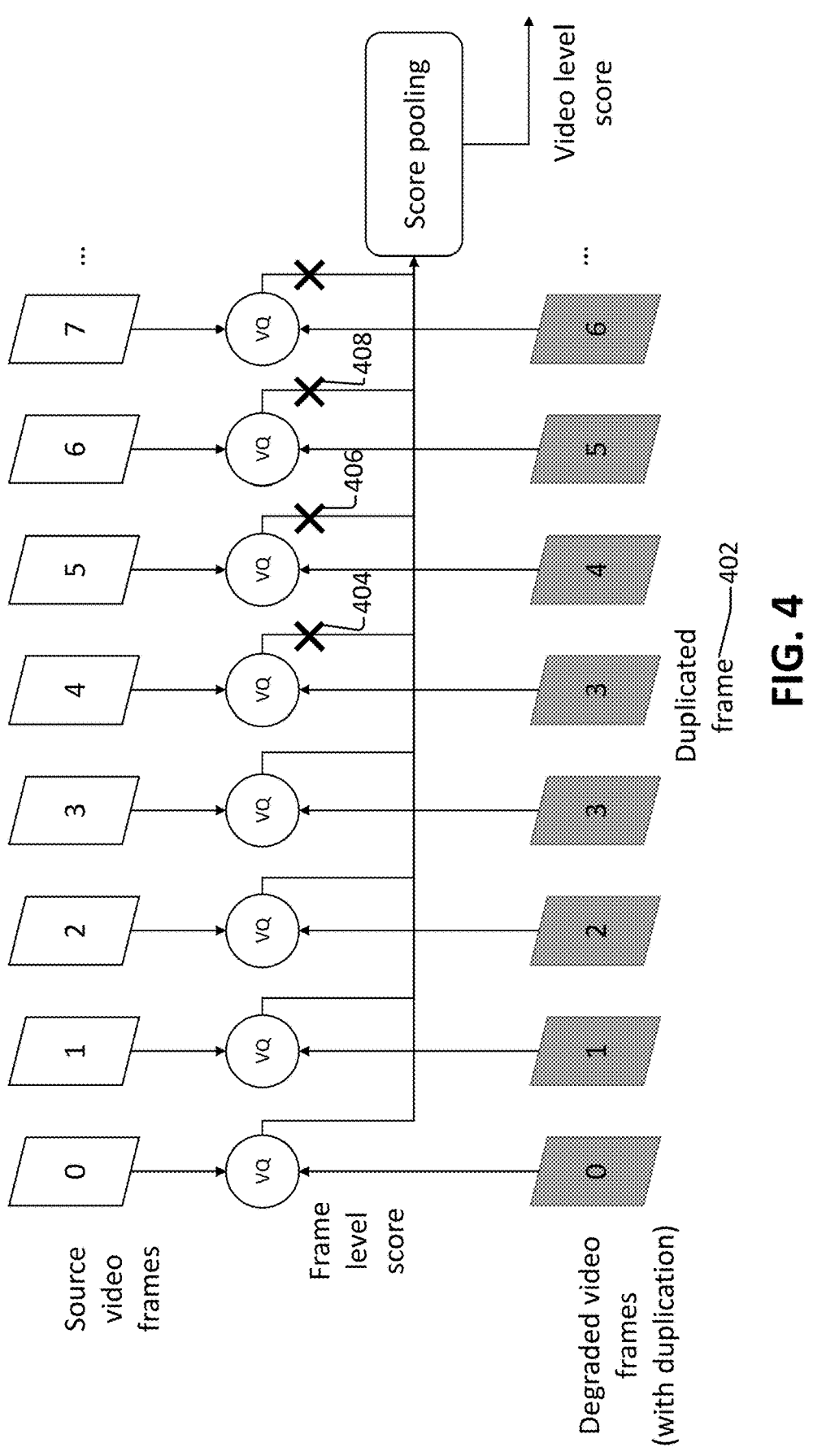
FIG. 4 depicts an example of when a duplicate frame occurs in the degraded video according to some embodiments.

FIG. 4 depicts an example of when a duplicate frame occurs in the degraded video according to some embodiments. In FIG. 4, frames may be duplicated for various reasons, such as to compensate for video frame fluctuation, time stamp misalignment, etc. Degradation process 108 may determine when to duplicate frames based on performing its degradation process. At 402, the degraded video frames include a duplicated frame of frame #3. That is, there are two frames #3 in the degraded video frames, whereas there is only one frame #3 in the source video frames. The duplicate frame #3 may result in a comparison between frames that may result in an inaccurate score. For example, at 404, the video quality process may compare frame #4 of the source video frame with frame #3 of the degraded video frames. The resulting frame level score may be inaccurate. This comparison should have been performed between corresponding frames #4 of the source video frames and the degraded video frames. Also, subsequent comparisons may also be inaccurate at 406 and 408, where frame #5 of the source video frames is compared to frame #4 of the degraded video frames, and frame #6 of the source video frames is compared to frame #5 of the degraded video frames. Once again, the frame level scores may be inaccurate, and the video level score may thus also be inaccurate.

In view of the above variations in the degraded video and other variations that may occur, the following describes a frame matching process that may match frames to improve the video quality process.

Frame Matching Process

Figure 5:
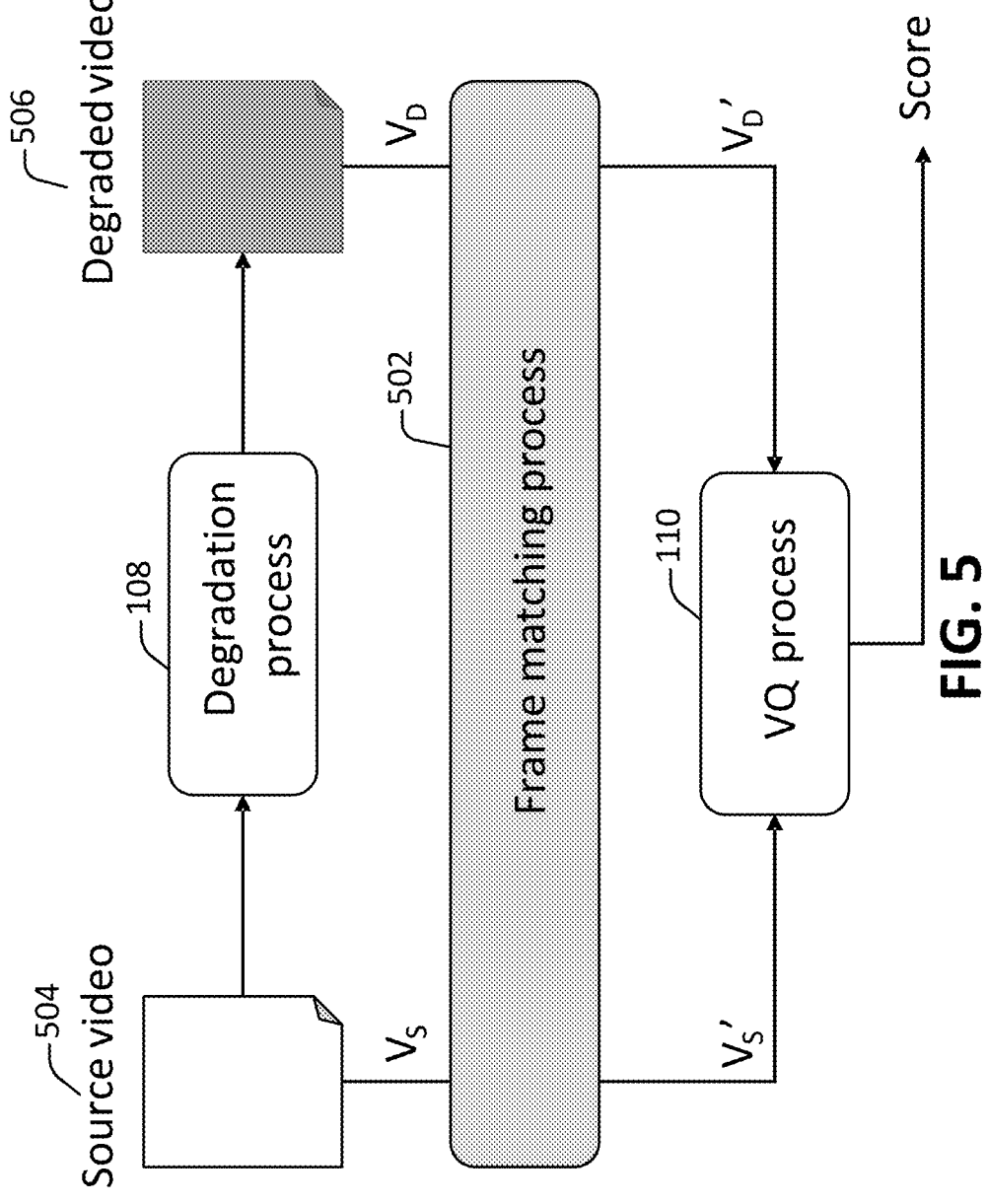
FIG. 5 depicts an example of a frame matching process according to some embodiments.

FIG. 5 depicts an example of a frame matching process 502 according to some embodiments. The following frame matching process may use characteristics of frames to determine matching frames. The frame matching process may not have to use any type of internal detection from the degradation process to determine whether or not the frames have been duplicated, dropped, out of order, etc. That is, an analysis of a transcoder that is compressing the video is not needed to determine whether the internal process created duplicate frames or not. Further, it may not be possible to track the internal process of the degradation process, because it may be performed by another party or the tracking may not be available.

In the process, at 504, a source video $V_S$ is received and inputted into degradation process 108. Degradation process 108 outputs a degraded video $V_D$ at 506. The source video $V_S$ and the degraded video $V_D$ are input into frame matching process 502.

Frame matching process 502 may output a new version of the source video $V_{S'}$ and a new version of the degraded video $V_{D'}$ that meet a frame matching condition (or conditions) of the frame matching process. For example, a matching frame is determined when a comparison score may meet a threshold. The frame matching condition may determine matching frames for the video quality process from the source video and the degraded video. This may take into account variations that occurred in the degraded video, such as frame dropping, duplicate frames, or out of order frames. Then, a video quality process 110 may analyze corresponding frames in the new version of the source video and the new version of the degraded video frame by frame, such as sequentially.

Figure 6:
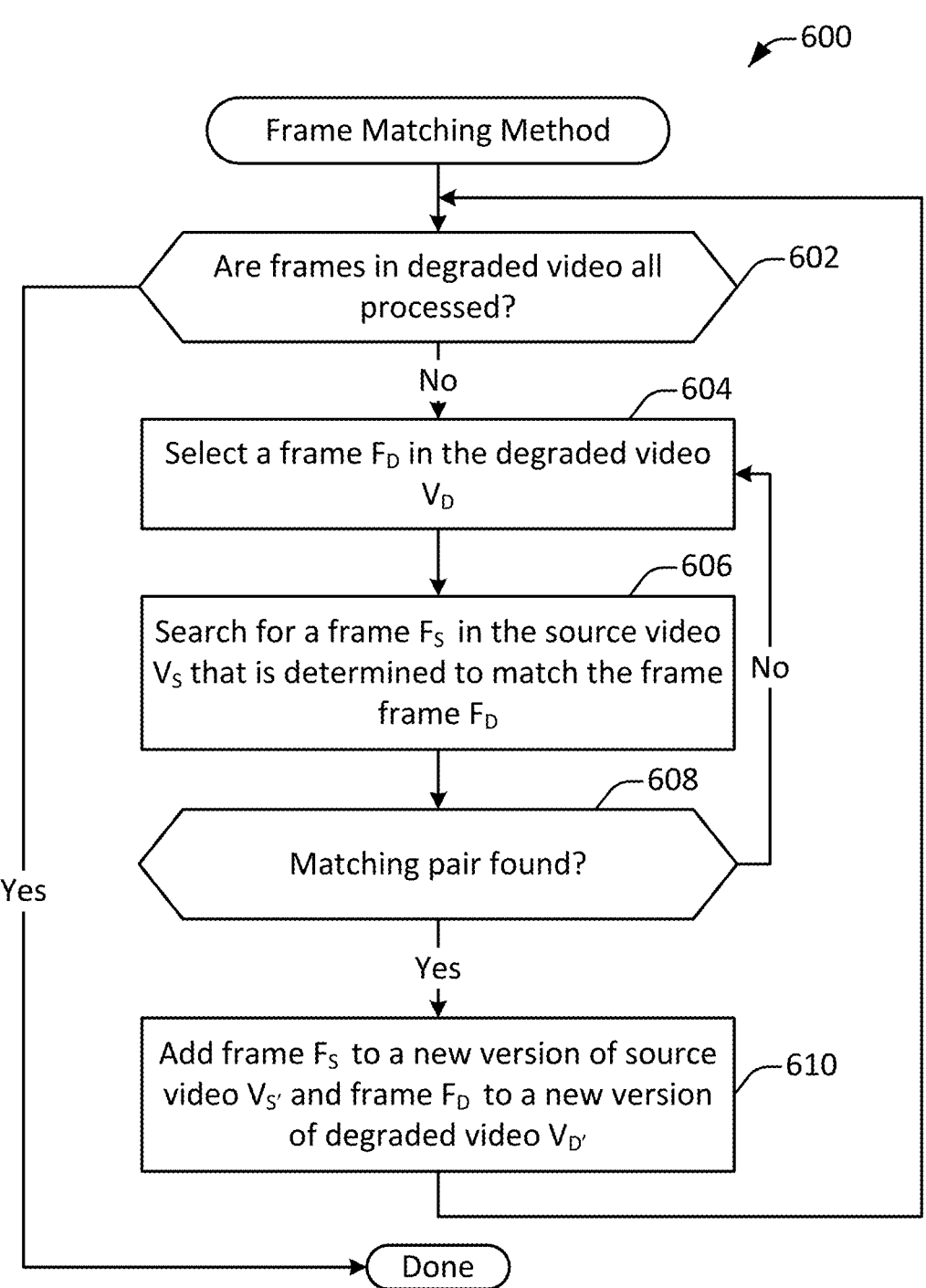
FIG. 6 depicts a simplified flowchart of a frame matching method according to some embodiment.

FIG. 6 depicts a simplified flowchart 600 of a frame matching method according to some embodiment. At 602, frame matching process 502 determines if frames in the degraded video have all been processed. If not, at 604, frame matching process 502 selects a frame $F_D$ in the degraded video. For example, frame matching process 502 may select frame #0 first, then frame #1, etc. That is, frame matching process 502 selects each frame sequentially in the degraded video, but frames of the degraded video may be selected in different orders.

At 606, frame matching process 502 searches for a frame $F_S$ in the source video that is determined to match the frame $F_D$ in the degraded video. A frame $F_S$ that matches frame $F_D$ may satisfy a matching condition. In some embodiments, a frame from the degraded video may be used and frames from the source video are searched for a similar frame. Different methods may be used to search for the frame in the source video. For example, a number of frames near the frame from the degraded video may be searched, such as frames five seconds before the frame in the degraded video and five seconds after the frame in the degraded video. That is, the entire source video may not be searched. If no frame exists in the searched frames from the source video, then matching process 502 may indicate that this frame in the degraded video has no match. This frame in the degraded video may not be included in a new version of the degraded video. In other examples, the frame may be included in a new version of the degraded video, but not be compared to a frame in the source video for the video quality process. A score for the frame may be output based on a corresponding frame not being included in the source video, which may indicate a low quality score because the degraded video frame does not match any frames in the source video. The frame matching process may correct the above described mismatched frames. For example, matching process 502 may find the correct frame of the source video for a duplicated frame in the degraded video. Also, matching process 502 may detect dropped frames because a dropped frame may not be searched for in the source video. Further, out of order frames may be found in the source video, because the out of order frames may be close to the original position of the frame in the source video. Different metrics may be used to search for the frame $F_S$ in the source video, which will be described in more detail below in FIG. 8.

At 608, frame matching process 502 determines if a matching pair is found. If not, the process reiterates to 604 where another frame $F_D$ in the degraded video is selected. If a matching pair has been found, frame matching process 502 adds a frame $F_S$ from the source video that matches the frame $F_D$ in the degraded video to a new version of the source video $V_{S'}$. Also, frame matching process 502 adds the frame $F_D$ in the degraded video to a new version of the degraded video $V_{D'}$. The process then reiterates to 602, where frame matching process 502 determines if all frames in the degraded video have been processed. When all frames have been processed, frame matching process 502 may then be ended. If all frames have not been processed, the process continues with another frame from the degraded video. Although frames from the degraded video are selected, frames from the source video may be selected, and frames in the degraded video may be searched to determine matching frames.

Figure 7:
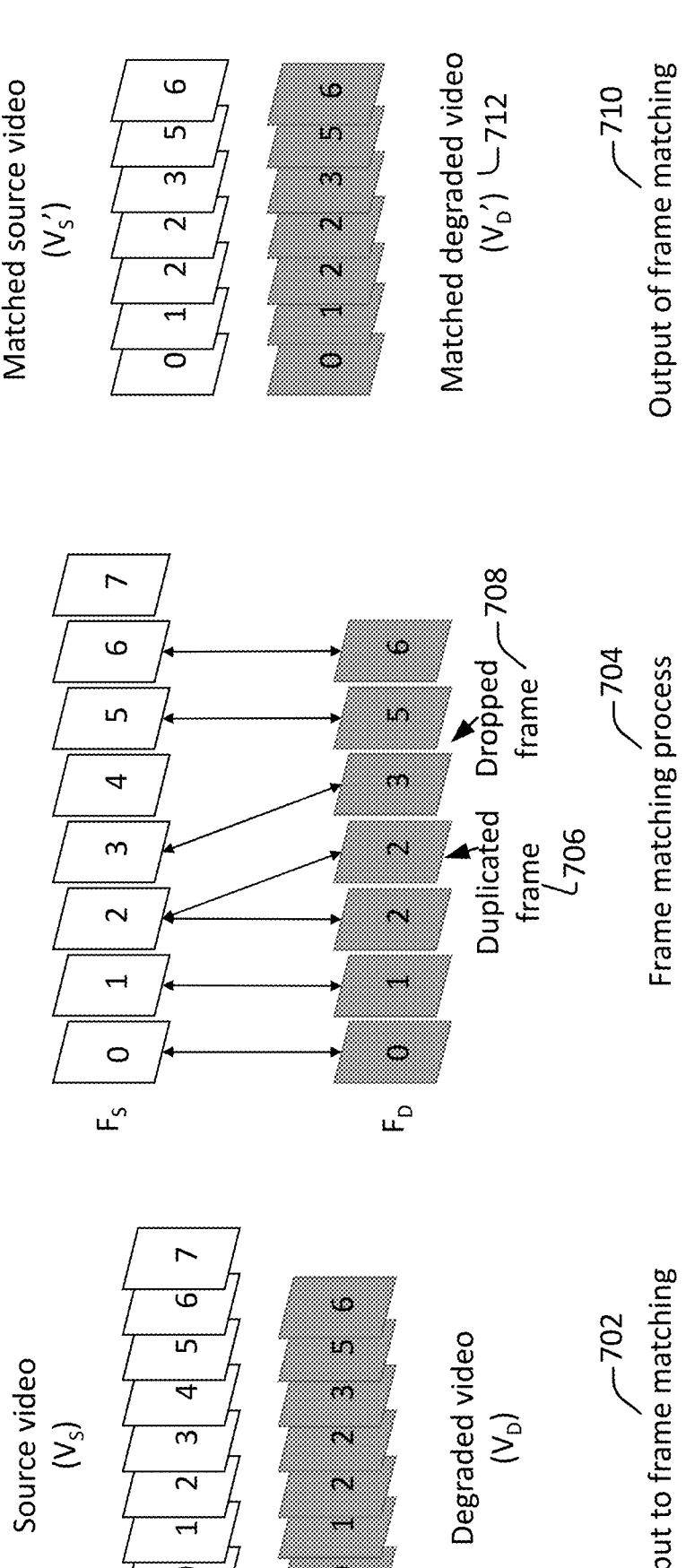
FIG. 7 depicts an example of the output of the frame matching process according to some embodiments.

FIG. 7 depicts an example of the output of the frame matching process according to some embodiments. At 702, the input to the frame matching process 502 is shown. For example, a source video $V_S$ and a degraded video $V_D$ are input. The source video includes frames 0, 1, 2, 3, 4, 5, 6, and 7. The degraded video includes frames 0, 1, 2, 2, 3, 5, 6, and 7. In this case, frame #2 of the source video has been duplicated in the degraded video and frame #4 of the source video has been dropped in the degraded video.

At 704, frame matching process 502 determines the matching frames $F_S$ from the source video to the frames $F_D$ of the degraded video. For example, at 706, frame matching process 502 determines that the duplicated frame #2 in the degraded video matches frame #2 in the source video. Also, at 708, the frame matching process determines that frame #4 was dropped in the degraded video.

At 710, the output of frame matching process is shown. For example, at 712, the new version of the source video $V_{S'}$ includes two frames #2 and the new version of the degraded video $V_{D'}$ includes two frames #2. Also, the new version of the source video $V_{S'}$ does not include frame #4, and the new version of the degraded video $V_{D'}$ does not include frame #4. Accordingly, both the new version of the source video and the new version of the degraded video include the following frames: 0, 1, 2, 2, 3, 5, and 6. It is noted that frame #7 is also not included in the new version of the degraded video because it is not found in the degraded video. Further, although the sequence of the new version of the degraded video is the same as the original version of the degraded video, the sequence of the new version of the degraded video may be different. For example, although not shown, an out of order variation of frames in the degraded video may also be accounted for by rearranging the frame numbers in the new versions of the source video. For example, when frames are out of order, the new version of the degraded video may be kept out of order in the new version of the degraded video, but in other examples, the new version of the degraded video may reorder the frames. When new versions are described, the new version may be stored in different ways. For example, new files with the frames of the new versions may be stored. Also, pointers to frames in the source video and the degraded video may be used to generate the new versions. For example, the new version of the source video may include pointers to frames 0, 1, 2, 2, 3, 5, and 6 of the source video and the new version of the degraded video may include pointers to frames 0, 1, 2, 2, 3, 5, and 6 of the degraded video. The corresponding frames may be retrieved using the pointers.

When the video quality process is performed, video quality process 110 may analyze the corresponding frames, such as by analyzing the frames sequentially. Using the new versions of the source video and the degraded video, video quality process 110 may compute accurate frame level quality scores between the frames. For example, the second duplicated frame #2 in the degraded video be compared to the frame #2 in the new version of the source video. This yields an accurate comparison of the quality of frame #2 in the degraded video because frame #2 in the source video was used to generate the degraded version of frame #2. It is noted that a duplicate frame may not include the same exact characteristics as the other frame. For example, the first frame #2 in the degraded video may have a higher quality than the second frame #2 in the degraded video. Also, the missing frame #4 does not have a comparison performed, which may have resulted in an inaccurate frame level score if a comparison was performed between mismatched frames.

This also saves computing resources as additional frame comparisons are not needed to correct the inaccurate score.

Video degradation may be caused by various reasons and result in different variations in characteristics. Thus, it may be challenging to use a single metric or process to determine matching frames. Different metrics may focus on different characteristics of the video/image. For example, Peak signal-to-noise ratio (PSNR) may only calculate pixel precision, which may be destroyed by compression or filtering to the video. Structural Similarity Index (SSIM) or Video Multi-Method Assessment Fusion (VMAF) may consider some structure information of the image into calculation, but may be not enough for a quality process alone. Other metrics may analysis the video content in a high-level abstraction, e.g., edges, angles, corners, shape pattens, or frequency components; however, these metrics will neglect the pixel level fidelity. Given that some frames that have similar video, such as sequential frames of a movie or show, using a single metric may not be able to determine an accurate matching frame. Accordingly, the combination of metrics may determine a frame that matches the degraded video frame.

Figure 8:
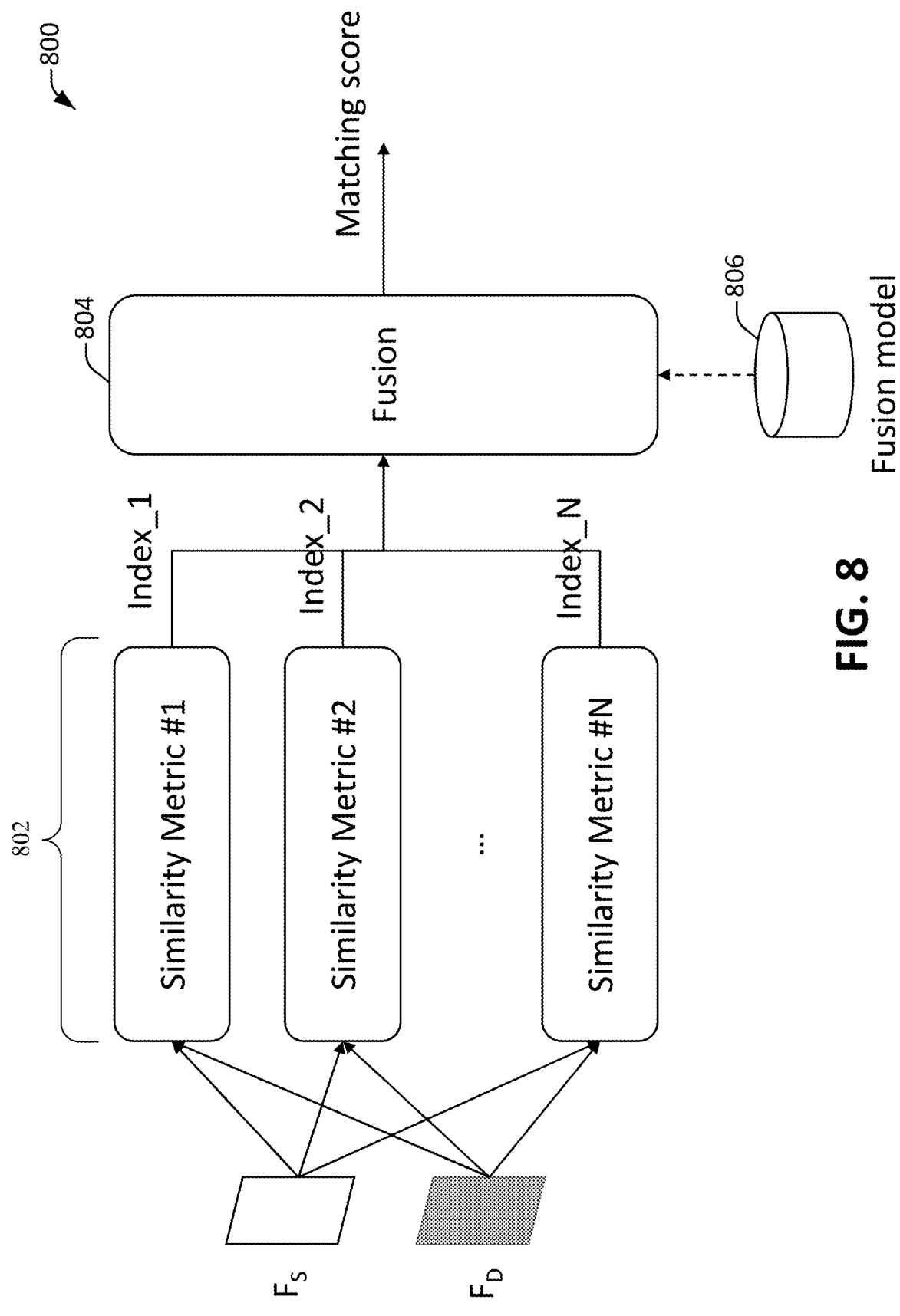
FIG. 8 depicts an example of a frame matching process using a fusion-based method according to some embodiments.

In some embodiments, frame matching process 502 uses a fusion-based frame matching process may be used. FIG. 8 depicts an example of a frame matching process using a fusion-based method according to some embodiments. The fusion-based method may use multiple similarity metrics to determine if a pair of frames in the degraded video and the source video match.

At 802, a frame $F_D$ from the degraded video and a frame $F_S$ from the source video may be received and input into multiple similarity metric analysis processes #1, #2, . . . , #N. Each similarity metric analysis process may output an index value indicating a measure of similarity between the two frames. For example, a larger index value may indicate higher similarity, and a lower index value may indicate lower similarity, but other measurements may be used.

Similarity metrics may be selected to account for different variations that may occur in the degradation process. In some embodiments, the following metrics may be used, but other metrics may be appreciated:

Root mean square error (RMSE),

Peak signal-to-noise ratio (PSNR),

Structural Similarity Index (SSIM),

Video Multi-Method Assessment Fusion (VMAF),

Feature-based similarity index (FSIM),

Information theoretic-based Statistic Similarity Measure (ISSM),

Signal to reconstruction error ratio (SRE),

Spectral angle mapper (SAM),

Universal image quality index (UIQ)

Root mean square error (RMSE) measures the amount of change per pixel between the frame of the source video and the frame of the degraded video. The peak signal-to-noise ratio (PSNR) may be an expression for the ratio between the maximum possible value (e.g., power) of the frame of the source video and the power of the frame from the degraded video. Structural similar index (SSIM) measure may quantify the image quality degradation between the frame of the source video and the frame of the degraded video. Video Multi-Method Assessment Fusion (VMAF) can be used to evaluate the quality of different video codecs, encoders, encoding settings, or transmission variants. Feature similarity indexing (FSIM) method may compare the structural and feature similarity measures between the frame of the degraded video and the frame of the source video. Information theoretic-based statistic similarity measure (ISSM) may interpolate the differences between the frame of the source video and the frame of the degraded video based on image intensity values. Signal to reconstruction error (SRE) measures the error relative to the power of the frame of the source video and the power of the frame from the degraded video. Spectral angle mapper (SAM) determines the spectral similarity between the spectra found in the degraded video and the source video. Universal image quality index (UIQ) may model distortion for the frame of the degraded video and the frame of the source video.

Each metric may be compared between the frame of the source video and the frame from the degraded video. A value for the comparison is output, which is represented by index 1, index 2, . . . , index N. Different metrics may output numbers within a different dynamic range. For example, RMS could be 0~255 for 8-bit video, PSNR is between 20~60 dB, VMAF is between 30~98, and others metric may output values between 0%-100%. These numbers may be normalized within a range such as [0, 1].

A fusion engine 804 may then receive the index values and output a matching score that indicates whether the frame of the degraded video matches the frame of the source video. Different fusion models at 806 may be used to determine if the frames are determined to match. One example of the fusion model may be a linear model such as:

$$\text{Matching score} = w\_1 * \text{index}\_1 + w\_2 * \text{index}\_2 + \ldots + w\_N * \text{index}\_N,$$

where the weights may be weighting coefficients, which could be predefined, offline trained using a training video set, or determined in other ways. The matching score combines the weighted index scores. Weights may be used reflect which kind of characteristics will play more critical role, according to the specific use cases and tasks. For example, different metrics may focus on different dimensions or abstract levels of the video/image characteristics. Thus, the weighting factors can be adjusted to focus on which characteristics are important. For example, in some scenarios, the consumers may care about the main objects while tolerating the details in the background such as the grass, sky, etc. More weight may be given to higher-level metrics, such as FSIM, ISSM, etc. While in other scenarios, all the details are important to the viewers, then the weighting factors of RMSE, PSNR are set to be larger than others. Other models may also be used to generate the matching score based on the indexes. For example, machine learning may be used to generate the index scores and/or generate a matching score.

Frame matching process 502 may analyze the matching score to determine whether the frame from the degraded video matches the frame from the source video. Different methods may be used. For example, a threshold may be used where the matching score is compared to the threshold. If the matching score meets the threshold (e.g., is equal or above the threshold), then a match may be determined. For example, if the threshold is 90%, and a higher matching score indicates a higher similarity between the frame of the degraded video and the frame of the source video, then a matching score of 95% may indicate that the inputted frame from the degraded video matches the inputted frame from the source video. However, a value of 50% may indicate that the frame from the degraded video is less similar to the frame from the source video, and does not match.

Different thresholds may be used. For example, a hard threshold and a soft threshold may be used. A hard threshold may be the only threshold that may be used when comparing frames from a degraded video. For example, the hard threshold may be set at 90% to determine matching frames for the new version of the source video and the new version of the degraded video. The hard threshold may be set based on different factors, such as domain knowledge determined from analyzing other videos, or other features that were used in the degradation process, such as coding standards, encoders, and coding parameters. The hard threshold may be changed for different videos or each iteration of the degradation process that is used. However, the hard threshold may remain the same to determine the new version of the degraded video and the new version of the source video. Also, the comparison may define multiple hard thresholds, such as a first threshold for frames #1-#100 and a second threshold for frames #101-#200.

A soft threshold may be dynamic and may change as the frames of the degraded video are analyzed. For example, the soft threshold may be first set to a value, such as a predefined value. Then, as frames are analyzed, the soft threshold may be changed based on the actual matching score values that are received. For example, if no frames are being matched, then, the threshold may be too high. However, if all frames are being matched, then the threshold may be too low. Threshold may be too low because it may be expected that the degradation process generated some drop frames or duplicate frames.

The severity of frame sequence variation of the degraded video may be taken into consideration to obtain the final video quality measurement. A lower quality score may be outputted when more mis-matched or re-ordered frames are detected in the matching process. Given the source version and degraded version of a video, the following statistics may be calculated after the process of frame matching shown in FIG. 6.

$$R_M(\text{Mis-matched ratio}) =$$
$$1 - (\text{matched frame count})/(\text{total original frame count})$$
$$R_D(\text{Duplicated ratio}) =$$
$$(\text{duplicated frame count in matched frames})/(\text{total original frame count})$$
$$R_R(\text{Reordered ratio}) =$$
$$(\text{reordered frame count in matched frames})/(\text{total original frame count})$$

Given these statistics, video quality process 110 may adjust the video level quality score and output a final quality score. The adjustment may use the sequence variation detected, such as by the following formula, $$\text{VQ\_Score}' = A(R_M, R_D, R_R) * \text{VQ\_Score} - B(R_M, R_D, R_R),$$

where the function $A(R_M, R_D, R_R)$ and $B(R_M, R_D, R_R)$ are two quantities decided by $R_M, R_D, R_R$, which reduce the quality score according to the severity of frame sequence variation. For example, $A(R_M, R_D, R_R)$ and $B(R_M, R_D, R_R)$ could be:

$$A(R_M, R_D, R_R) = (1 - R_M) * (1 - R_D) * (1 - R_R); B(R_M, R_D, R_R) = 0,$$

or $$A(R_M, R_D, R_R) = 1; B(R_M, R_D, R_R) = \text{MAX\_VQ\_Score} * (R_M + R_D + R_R).$$

CONCLUSION

The frame matching process may be performed for the entire degraded video, which may capture any variations in the frames of the degraded video. Accordingly, the process is robust in detecting variations and providing accurate frame level and video level scores by matching frame pairs between the degraded video and the source video. Using the frame matching process, the video quality process may be run once and the frame level and video level scores for the video quality may be considered accurate.

The frame matching process improves the video quality process by aligning and matching frames between the degraded video and the source video to create a new version of the source video and a new version of the degraded video. Then, the quality process may be performed faster because the frames that are inputted into the video quality process are frames intended to be matched and compared. Also, the video level and frame level scores are more accurate due to the frame matching process.

System

Figure 9:
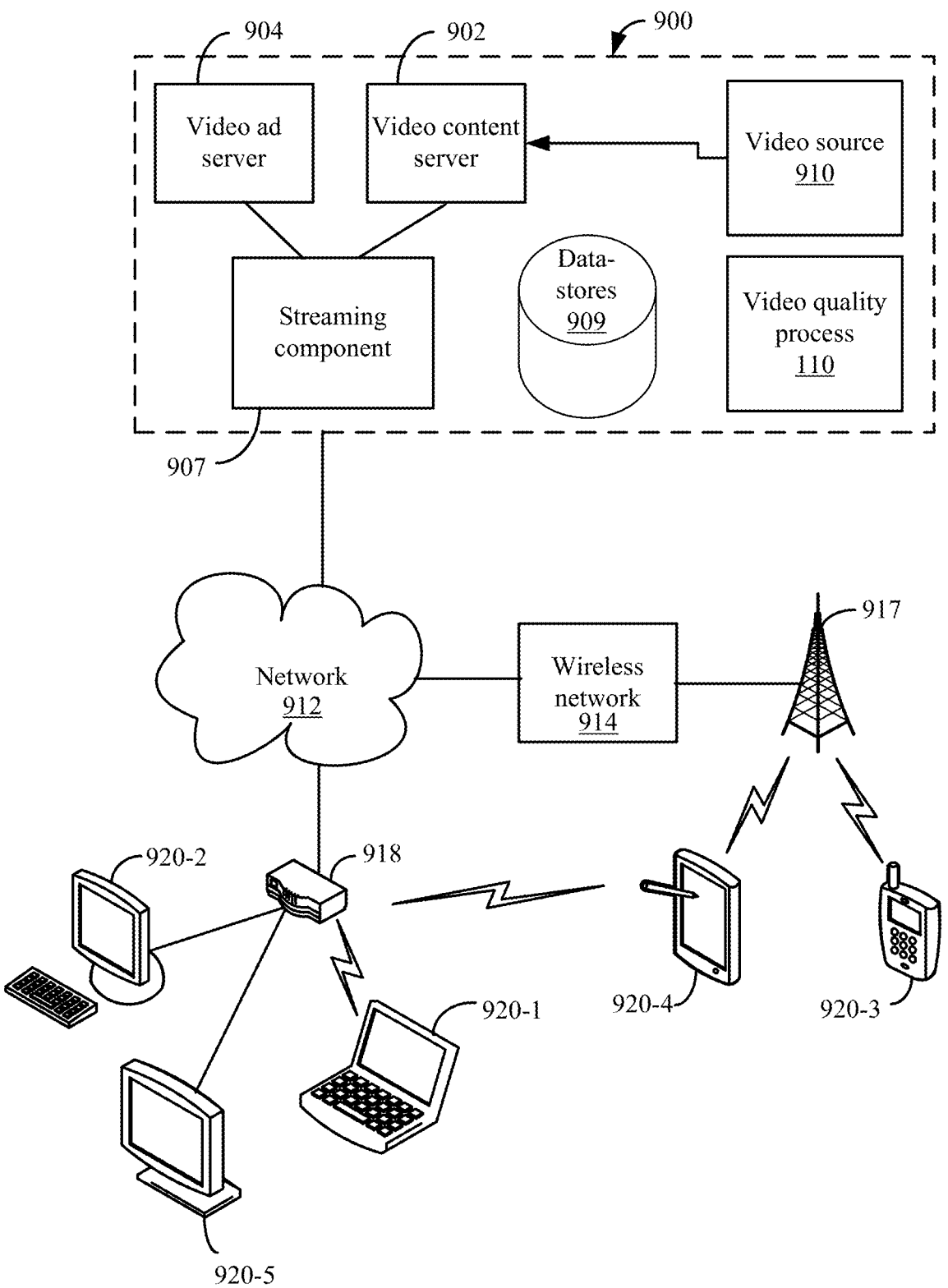
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown).

The video streaming system 900 also may include video quality process 110.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless network 914 (e.g., a wireless cellular telecommunications network (WCS)), or some combination of these or similar networks.

One or more client devices 920 may be in communication with the video streaming system 900, via the data communication network 912, wireless network 914, or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for wireless network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HyperText Transfer Protocol (HTTP) and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
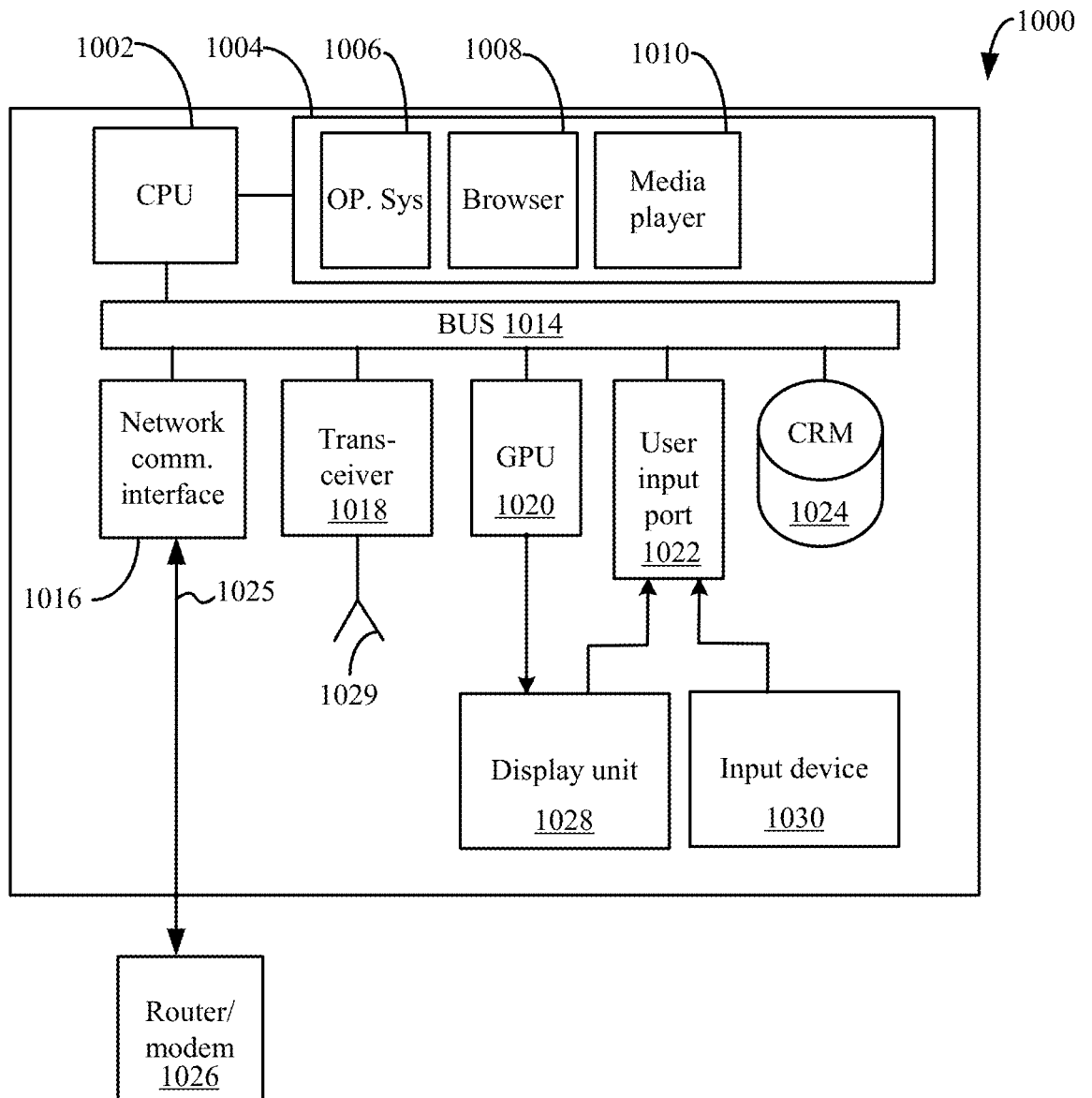
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured or operable to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules for operating system 1006, browser 1008, and media player 1010 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured or operable to perform one or more operations of a method as described herein.

A network communication (comm.) interface 1016 may also be connected to the bus 1014. The network communication interface 1016 may provide or support two-way data communication between the apparatus 1000 and one or more external devices, e.g., the streaming system 900, optionally via a router/modem 1026 and a wired or wireless connection 1025. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera, or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a first video;
   processing, by the computing device, frames of the first video to generate a second video;
   performing, by the computing device, a frame matching process to determine whether frames of the second video and frames of the first video meet a condition that determines whether frames match to generate a new version of the second video and a new version of the first video, wherein a sequence of frames in the new version of the first video is different from the first video;
   comparing, by the computing device, frames of the new version of the second video and frames of the new version of the first video to generate a plurality of frame level scores based on a quality metric;
   outputting a video level score based on the plurality of frame level scores; and
   adjusting the video level score based on statistics from the frame matching process that determine whether frames match in the first video and the second video to determine an adjusted video level score, wherein the statistics include a mis-matched frame count, a duplicated frame count, and a number of reordered frame count.

2. The method of claim 1, wherein a first set of frames in the second video includes a variation from a second set of frames in the first video.

3. The method of claim 2, wherein the variation is in a sequence of frames in the first set of frames compared to the second set of frames.

4. The method of claim 2, wherein the variation comprises at least one of a dropped frame, a duplicated frame, and an out of order frame in the first set of frames.

5. The method of claim 2, wherein the variation is created when generating the second video using a degradation process, wherein the degradation process changes a characteristic of the first video to generate the second video.

6. The method of claim 1, wherein the second video is a degraded version of the first video.

7. The method of claim 1, wherein performing the frame matching process comprises:
   selecting a first frame in the second video; and
   searching for a corresponding first frame in the first video that is determined to meet a matching condition.

8. The method of claim 7, wherein performing the frame matching process comprises:
   when the matching condition is met, outputting the corresponding first frame in the first video and the first frame in the second video as a matching pair.

9. The method of claim 7, wherein performing the frame matching process comprises:
   when the matching condition is met, storing information for the corresponding first frame in the first video in the new version of the first video and storing information for the first frame in the second video in the new version of the second video.

10. The method of claim 1, wherein the new version of the first video and the new version of the second video includes matching frames from the frame matching process.

11. The method of claim 1, wherein new version of the first video does not include a frame that is determined to be dropped from the second video.

12. The method of claim 1, wherein new version of the first video includes a duplicate frame that is determined to be duplicated in the second video.

13. The method of claim 1, wherein new version of the first video includes an out of order frame that is determined to be out of order in the second video.

14. The method of claim 1, wherein performing the frame matching process comprises:
   determining a first frame from the second video;
   determining a second frame from the first video;
   determining a plurality of similarity metric values based on comparing a plurality of similarity metrics from the first frame and the second frame; and using the plurality of similarity metric values to determine whether the first frame and the second frame meet a condition.

15. The method of claim 1, wherein performing the frame matching process comprises:

comparing a first frame from the second video and a second frame from the first video;

outputting a frame level score based on the comparing; and comparing the frame level score to a threshold to determine whether the first frame and the second frame meet a condition to determine that the first frame and the second frame match.

16. The method of claim 15, wherein the threshold changes as different frames are compared from the second video based on feedback from previous comparisons of frames.

17. The method of claim 1, wherein adjusting the video level score based on statistics from the frame matching process comprises:

adjusting the video level score based on a first function of the mis-matched frame count, the duplicated frame count, and the number of reordered frame count and a second function of the mis-matched frame count, the duplicated frame count and the number of reordered frame count, wherein the first function and the second function are different.

18. The method of claim 17, wherein:

the adjusted video level score is the first function times the video level score minus the second function.

19. A non-transitory computer-readable storage medium having stored thereon computer executable instructions, which when executed by a computing device, cause the computing device to be operable for:

receiving a first video;

processing frames of the first video to generate a second video;

performing a frame matching process to determine whether frames of the second video and frames of the first video meet a condition that determines whether frames match to generate a new version of the second video and a new version of the first video, wherein a sequence of frames in the new version of the first video is different from the first video;

comparing frames of the new version of the second video and frames of the new version of the first video to generate a plurality of frame level scores based on a quality metric;

outputting a video level score based on the plurality of frame level scores; and adjusting the video level score based on statistics from the frame matching process that determine whether frames match in the first video and the second video to determine an adjusted video level score, wherein the statistics include a mis-matched frame count, a duplicated frame count, and a number of reordered frame count.

20. An apparatus comprising:

one or more computer processors; and a computer-readable storage medium comprising instructions for controlling the one or more computer processors to be operable for:

receiving a first video;

processing frames of the first video to generate a second video;

performing a frame matching process to determine whether frames of the second video and frames of the first video meet a condition that determines whether frames match to generate a new version of the second video and a new version of the first video, wherein a sequence of frames in the new version of the first video is different from the first video;

comparing frames of the new version of the second video and frames of the new version of the first video to generate a plurality of frame level scores based on a quality metric;

outputting a video level score based on the plurality of frame level scores; and adjusting the video level score based on statistics from the frame matching process that determine whether frames match in the first video and the second video to determine an adjusted video level score, wherein the statistics include a mis-matched frame count, a duplicated frame count, and a number of reordered frame count.

\* \* \* \* \*